F. MARTIN, Sr.
CLOSURE REMOVER.
APPLICATION FILED SEPT. 10, 1909.
952,827.
Patented Mar. 22, 1910.
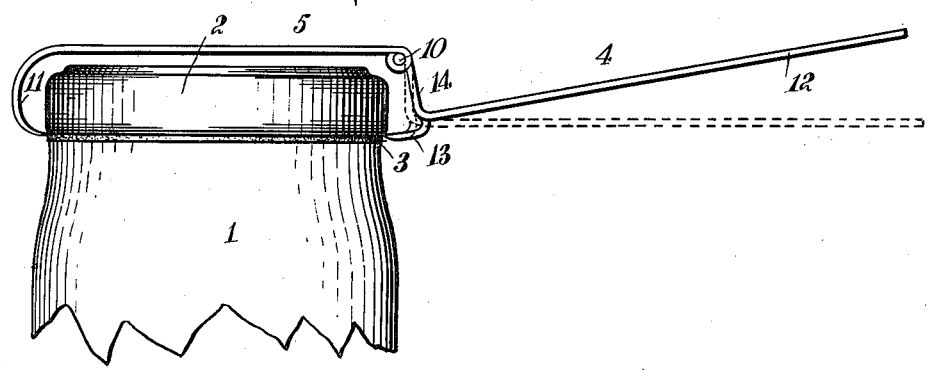
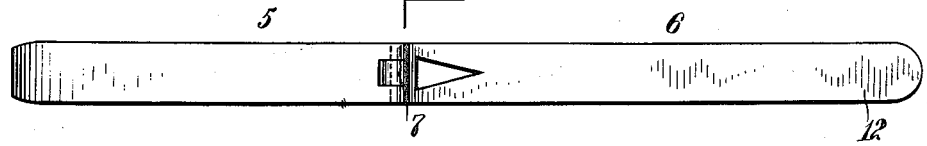
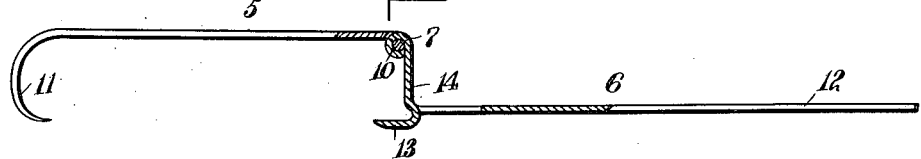
WITNESSES
INVENTOR
Frederick Martin Sr.
BY
Munn & Co
ATTORNEYS

UNITED STATES PATENT OFFICE.

FREDERICK MARTIN, SR., OF SHERRILL, NEW YORK.

CLOSURE-REMOVER.

952,827.  Specification of Letters Patent.  Patented Mar. 22, 1910.

Application filed September 10, 1909. Serial No. 517,021.

*To all whom it may concern:*

Be it known that I, FREDERICK MARTIN, Sr., a citizen of the United States, and a resident of Sherrill, in the county of Oneida and State of New York, have invented a new and Improved Closure-Remover, of which the following is a full, clear, and exact description.

My invention relates to closure removers, and has for its object to provide a device for removing the covers of fruit jars and the like, safely and quickly without fear of damaging the fruit jar or injuring the hands.

The usual method used when opening preserving jars and the like is to insert a knife beneath the cover and by exerting a pressure on the knife, force the cover upward. The cover usually is held securely to the jar by suction, created when the preserves or other contents were steamed, and the insertion of a knife beneath the cover not only mutilates the rubber washer used on preserving jars, but soon tends to dull the knife and likewise if the knife should slip, serious injury to the hands might result.

My device is compact, strong and durable, and can be quickly affixed to a jar and by slightly pressing downwardly on the handle of the implement, the cover is loosened and raised from the jar.

Reference is to be had to the accompanying drawings, forming a part of this specification, in which similar characters of reference indicate corresponding parts in all the views, and in which—

Figure 1 is a side elevation of a portion of a fruit jar with cover attached, and showing my device as applied, Fig. 2 is a plan view of my device, Fig. 3 is a side elevation, parts being in section, Fig. 4 is a face view of the hook portion of my device, and Fig. 5 is a face view of the grip and handle portion of my device.

On a fruit jar 1, comprising a cover 2 and a rubber washer 3, intermediate the jar 1 and the cover 2, is a closure opener 4 engaging the cover 2 of the jar 1. The closure opener 4 consists of a hook portion 5 and a handle portion 6, united by a suitable hinge 7 composed of bent projections 8 on the hook portion 5 and a bent projection 9 on the handle portion 6, through which is forced a hinge rod 10. The portion 5 is provided at one end with a hook 11 bent downwardly and the other end is provided with the rounded projections 8—8 forming the hinge 7. The portion 6 is provided with a handle 12 and a lateral projection 13, preferably formed by stamping the same from the handle 12, as is clearly shown in Fig. 5. A portion 14, formed at right angles to the handle 5 and integral with the projecting point 13, has its extremity 9 rounded to form a part of the hinge 7.

The operation of my device is as follows:—To remove the cover from a fruit jar or the like, the opener 4 is secured to the cover 2 so that the hook 11 grips the cover 2 beneath the same, just above the washer 3, and the projecting point 13 grips the cover beneath the same above the washer 3 on that side of the cover opposite the hook 11. A downward pressure is then exerted on the handle 12, as is shown in dotted lines in Fig. 1, and the cover 2 is loosened and raised from the jar 1.

By using this device as described, the washer 3 remains intact on the jar 1, and any injury to the jar and cover is prevented, likewise there is no danger of injuring the hands of the user.

It will be understood that although I have described my device as used on a fruit jar, it can be readily applied to all jars and the like having a construction similar to that as described. It will also be understood that I do not limit myself to this particular construction, the scope of my invention being fully defined in the appended claims.

Having thus described my invention, I claim as new and desire to secure by Letters Patent,—

1. A closure opener comprising a hooked member and an off-set handle hingedly connected with each other, the said hooked member having a gripping hook and the said handle having a lifting prong integral with the said handle.

2. A closure opener comprising a handle, an offset integral with the said handle, a lifting prong integral with the said handle, and a hooked member having a hook at one end, integral with the said hooked member, the said hooked member and the said handle being hingedly connected with each other.

3. In a closure opener for fruit jars, two members hingedly connected with each other to swing up and down, comprising hooked means on one member for gripping the said jar, and lifting means on the other member, for lifting the cover of the said jar.

4. In a closure opener, an offset handle, a lifting prong integral with the said handle, a hooked member hingedly connected to the said handle, and a gripping hook integral with the said hooked member.

5. In a closure opener, an offset handle, a lifting prong integral with the said handle, and a gripping member hingedly connected to the said handle.

6. In a closure opener, an offset handle, a lifting prong integral with the handle, parallel to the same and extending inwardly therefrom, and a hooked member hingedly connected to the handle, having an inwardly extending hook integral with the same, and opposite the said lifting prong.

In testimony whereof I have signed my name to this specification in the presence of two subscribing witnesses.

FREDERICK ✕ MARTIN, Sr.
his mark

Witnesses:
 Wm F. Lantry,
 Geo. W. Darrow.